(No Model.) 2 Sheets—Sheet 1.

J. D. KEFUSS.
VEHICLE ROLLER BEARING.

No. 556,678. Patented Mar. 17, 1896.

Witnesses
L. Clinton Hamlink
John W. Adams

Inventor
John D. Kefuss
by Dayton Pooles Brown
his Attorneys (No Model.) 2 Sheets—Sheet 2.

J. D. KEFUSS.
VEHICLE ROLLER BEARING.

No. 556,678. Patented Mar. 17, 1896.

Witnesses
Clinton Hamlink
Jno. W. Adams.

Inventor:
John D. Kefuss
by Dayton, Poole & Brown
his Attorneys

UNITED STATES PATENT OFFICE.

JOHN D. KEFUSS, OF HUDSON, MICHIGAN.

VEHICLE ROLLER-BEARING.

SPECIFICATION forming part of Letters Patent No. 556,678, dated March 17, 1896.

Application filed June 7, 1894. Serial No. 513,751. (No model.)

*To all whom it may concern:*

Be it known that I, JOHN D. KEFUSS, of Hudson, in the county of Lenawee and State of Michigan, have invented certain new and useful Improvements in Vehicle Roller-Bearings; and I do hereby declare that the following is a full, clear, and exact description thereof, reference being had to the accompanying drawings, and to the letters of reference marked thereon, which form a part of this specification.

This invention relates to improvements in roller-bearings for vehicle-axles.

More especially the invention relates to an improved construction in the roller elements and in the bushing and journal-box within which the roller elements are arranged and supported.

Among the objects of the invention are to provide a construction in bearings of the kind referred to in which friction shall be reduced to a minimum, both when the bearing is under light and heavy loads, one which may be applied to the ordinary vehicle-axles now in use without change of the latter being required, in which the wear is all on parts which may be readily and inexpensively renewed, and in which the vehicle-wheel may be removed from the axle, access had to the roller-boxes, if necessary, and replaced thereon without the rollers becoming displaced or disarranged, unless intentionally.

The invention has also as a further object to provide a construction specially adapted to relatively long and light journals and to similar-shaped journals subjected to heavy loads.

The invention consists in the matters hereinafter referred to and more specifically pointed out in the appended claims, and will be readily understood, reference being had to the accompanying drawings, in which—

Figure 1:
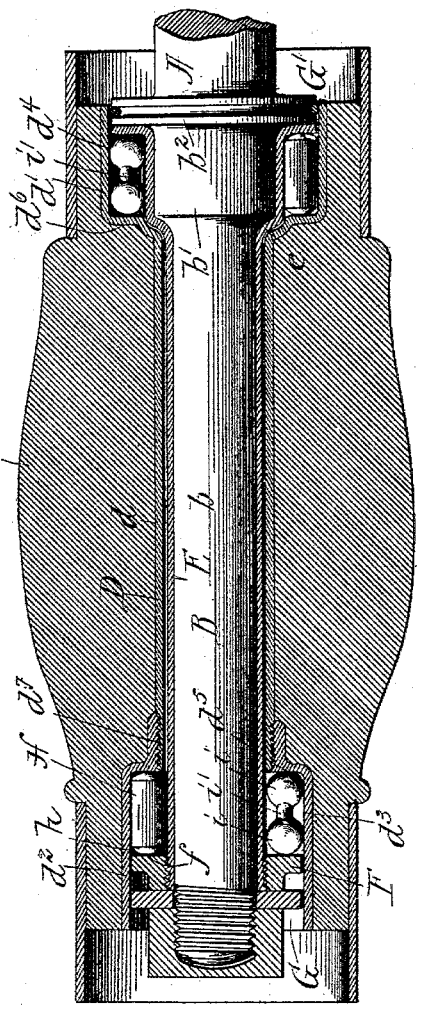
Figure 2:
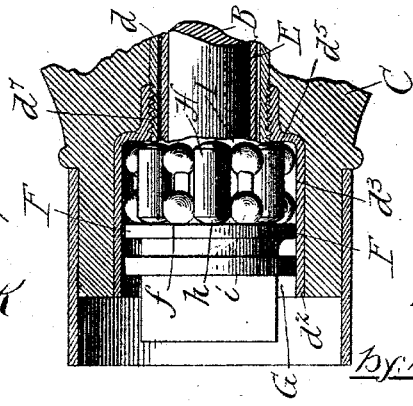
Figure 5:
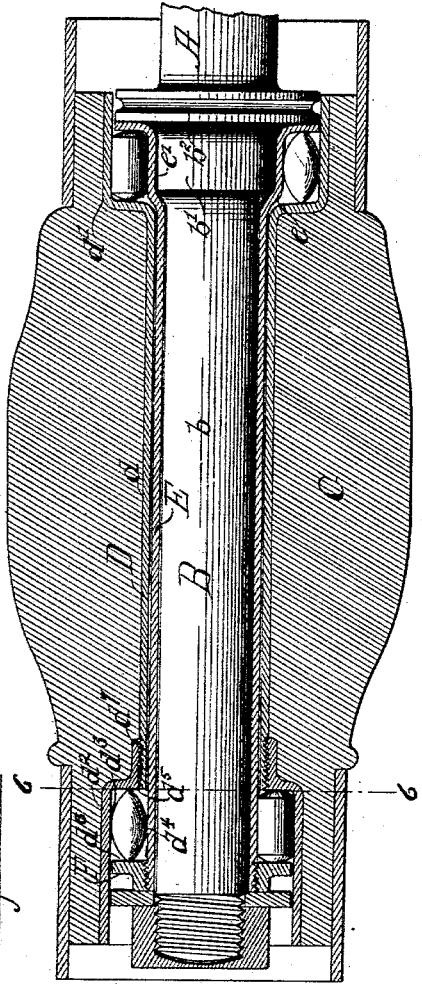
Figure 6:
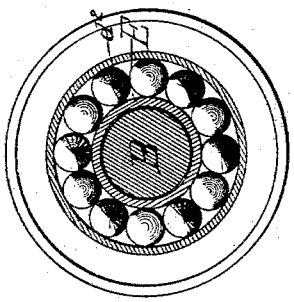
Figure 4:
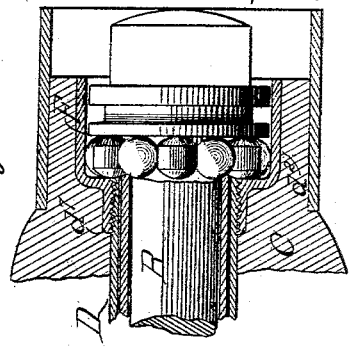
Figure 5:
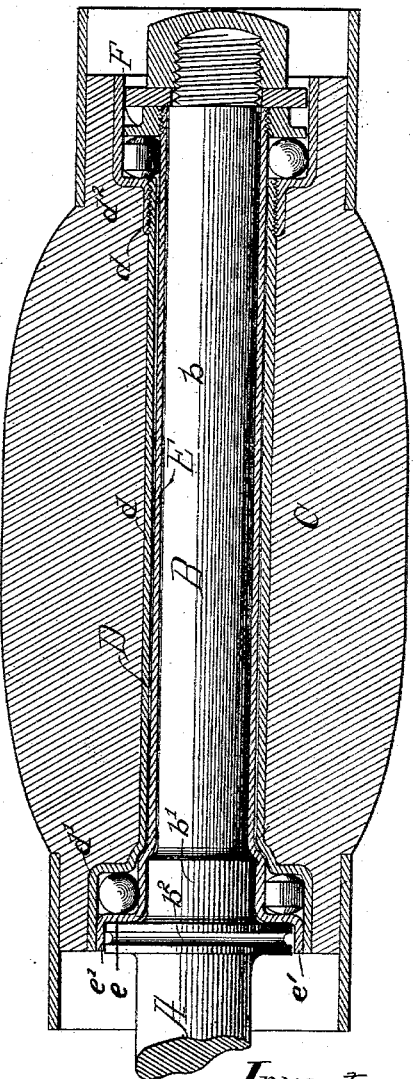

Figure 1 is an axial section of the hub of a buggy or similar vehicle wheel equipped with one form of my improved bearing. Fig. 2 is a similar view of the outer end portion of a hub, showing the arrangement of the roller elements. Figs. 3 and 4 are views similar to Figs. 1 and 2, respectively, showing a different combination of roller elements and corresponding modification in the shape of the roller-boxes. Fig. 5 is an axial section of a hub, showing still another combination of roller elements. Fig. 6 is a transverse section on the line 6 6 of Fig. 5.

As shown in said drawings, A designates the end portion of a metal buggy-axle having a spindle or journal B of the usual construction—that is, of uniform diameter throughout its main length $b$ and having a slightly-enlarged short portion $b'$ adjacent to the shoulder or flange $b^2$ of the axle.

C designates the vehicle-hub as a whole. Within the central bore of the hub is immovably secured a journal-box D, consisting of a straight central cylindric portion $d$ provided at each end with enlarged cylindric portions $d'$ $d^2$, constituting the roller-boxes proper of the bearing. For the purpose of assembling the parts one of said enlarged portions or roller-boxes (in this instance the outer end one) is made separable from the main cylindric portion $d$ and is threaded on the latter, as shown at $d^7$. In the present instance, in which part of the roller elements are cylindric with rounded ends, the enlarged portions $d'$ $d^2$ are rectangular in axial section, thus providing suitable bearing-surfaces $d^3$ $d^4$ for the straight sides of the rollers and vertical bearing-surfaces $d^5$ $d^6$ for the rounded ends of the same.

E is a bushing or sleeve of proper size and conformation to fit snugly over the spindle B and provided at its inner end with an outturned flange $e$ adapted to fit against the shoulder $b^2$ of the axle. In some instances the bushing E will be extended inward in the form of a straight cylindric portion $e'$, which overlies or surrounds the said shoulder $b^2$ of the axle, as shown in Fig. 3. The bushing E is slightly less in exterior diameter throughout its main part than the interior diameter of the box D and of proper length to extend the full length of the unthreaded part of the spindle. Upon its outer end is threaded an annular nut or ring F of proper exterior diameter to fit closely within the enlarged part $d^2$ of the box D and having an inner vertical face $f$, which, when the bushing is in position within the journal-box, forms the outer end closure of the outer end roller-box.

The interior diameters of the enlarged ends of the journal-box D are such as to form in conjunction with the end portions of the bushing E annular roller-boxes G G', within which the roller elements are arranged, the outer end of the outer box being closed by the annular nut F.

A journal-box thus constructed has important features of advantage when used in conjunction with roller elements of any suitable or desired form—as, for instance, with balls or cylinders, or the two combined; but as a novel and improved construction of the same I have herein shown a roller element particularly well adapted for use with a journal-box constructed as above described when combined or alternated with cylindric rollers. Such a combination is shown in Figs. 1 and 2 and consists of cylindrical rollers H of suitable length to fit longitudinally within the roller-boxes G G' and preferably provided with rounded or convex ends $h\ h$, alternated in their arrangement around the spindle with roller elements I of peculiar construction. The said rollers I each comprise two bodies $i\ i$, circular in transverse section, preferably of spherical or elliptical form, joined by a contracted portion or neck $i'$, giving to said element the general form of a dumb-bell. The extreme length of these elements is equal to that of the cylindric elements.

The above-described combination of roller elements has features of special advantage when used upon journals submitted to heavy loads, by reason of the fact that the cylindric rolls afford the extent of bearing-surface necessary to prevent defacement of the bearing-surfaces under heavy loads and to insure durability, thus obviating frequent adjustments of the bearings. At the same time the dumb-bell-shaped elements serve to maintain the roller elements accurately in alignment, while affording the minimum amount of contacting surface between those surfaces of the roller elements which necessarily revolve in opposite directions, thus minimizing the friction therein. The securing of the end portions of the dumb-bell element together also avoids all endwise or lateral friction between any of the elements, while at the same time such construction insures that the end or lateral wear will be always equal upon both forms of elements.

Constructed as above described the wheel is assembled by first arranging the roller elements within the inner end box, next inserting the bushing in place within the journal-box, then reversing the wheel and arranging the rollers within the outer roller-box, after which the annular nut is placed upon the outer end of the bushing and turned down sufficiently to properly confine the roller elements between the vertical end walls of their respective boxes. The wheel is now in readiness to be placed upon the spindle, upon which, as before stated, the bushing fits tightly, and the nut placed upon the end of the axle. From the above it will be obvious that the wheel may be removed from the axle at any time by simply removing the nut, as in the case of an ordinary wheel not provided with roller-bearings, and that when so removed the rollers are still perfectly boxed and cannot be disarranged. It is also obvious that access may be had to the rollers within the outer roller-box without removing the wheel from the axle by simply removing first the retaining-nut and then the annular nut F from the end of the bushing.

The construction herein described, wherein a set of relatively short roller elements is arranged at each end of the journal and interposed between the journal-box proper and a removable bushing or sleeve fitted upon the journal proper and of sufficiently smaller diameter to prevent contact or frictional engagement with said journal-box, has important advantages independent of any special form of roller element. With this arrangement the journal may be reduced to the smallest size consistent with necessary strength, and this may be such as to permit some springing or yielding of the journal under excessive loads, and there will still be no increased friction beyond that incident to the added weight carried, owing to the fact that such springing or yielding of the journal will bring no binding action upon the rollers. The arrangement insures that the principal wear incident to use of the journal-rods comes upon a removable bushing, which may be replaced at slight cost at any time, thus increasing the life of the axle and wheel indefinitely.

In Figs. 3 to 6, inclusive, I have shown different combinations of roller elements arranged in a hub constructed like that hereinbefore described, the size of the roller-housings being, of course, made to correspond to the different elements therein. The arrangement shown in said figure wherein a cylinder and ball or cylinder and elliptical element are alternated is of special utility as applied to a journal adapted for light loads—as, for instance, a bicycle or bicycle-sulky—the short cylindric elements affording the necessary contacting surface to insure durability in the most efficient form, while the spherical elements serve to separate the cylinders from each other with the minimum amount of frictional contact between the elements. It will be obvious that with such form of box and roller elements the journal may be made extremely light.

While in the foregoing description I have set forth what I consider to be the best forms of embodying my invention, yet I do not desire to be understood as wishing to limit myself to the precise forms described, as it will be obvious that such construction may be modified to some extent without departing from the spirit thereof.

I claim as my invention—

1. A roller-bearing for vehicle-journals comprising a journal-box secured within the hub of the wheel and provided at each end with an annular enlargement, a bushing or sleeve having at its inner end an exterior flange, arranged loosely within said journal-box and forming in conjunction therewith a closed annular roller-box at the inner end of the journal and an open-ended roller-box at its outer end, cylindrical and dumb-bell shaped roller elements arranged alternately within each of said roller-boxes, a nut arranged within the outer end of said journal-box and adapted to hold the outer set of rollers within the roller-box and the bushing from endwise movement with relation to the journal-box, and an outer nut threaded upon the end of the journal and adapted to hold the wheel thereon, substantially as set forth.

2. A roller-bearing for vehicle-journals, comprising a journal-box secured within the hub of the wheel and provided at each end with an annular enlargement, a bushing or sleeve having at its inner end an exterior flange arranged loosely within said journal-box and forming in conjunction therewith a closed annular roller-box at the inner end of the journal and an open-ended roller-box at its outer end, roller elements arranged within each of said roller-boxes, a nut arranged within the outer end of said journal-box and adapted to hold the outer set of rollers within the roller-box and the bushing from endwise movement with relation to the journal-box, and an outer nut threaded upon the end of the journal and adapted to hold the wheel thereon, substantially as set forth.

In testimony that I claim the foregoing as my invention I affix my signature in presence of two witnesses.

JOHN D. KEFUSS.

Witnesses:
JAMES B. THORN,
CARROLL C. COBB.